(12) United States Patent
Cho et al.

(10) Patent No.: US 10,495,199 B2
(45) Date of Patent: Dec. 3, 2019

(54) POWER TRANSMISSION APPARATUS FOR A VEHICLE

(71) Applicants: HYUNDAI MOTOR COMPANY, Seoul (KR); KIA MOTORS CORPORATION, Seoul (KR)

(72) Inventors: Wonmin Cho, Hwaseong-si (KR); Seong Wook Hwang, Gunpo-si (KR); Hyun Sik Kwon, Seoul (KR); Ki Tae Kim, Incheon (KR); Jae Chang Kook, Hwaseong-si (KR); Seongwook Ji, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 155 days.

(21) Appl. No.: 15/821,261

(22) Filed: Nov. 22, 2017

(65) Prior Publication Data
US 2019/0120351 A1    Apr. 25, 2019

(30) Foreign Application Priority Data
Oct. 19, 2017  (KR) ........................ 10-2017-0135813

(51) Int. Cl.
*F16H 3/10* (2006.01)
*F16H 37/04* (2006.01)
(Continued)

(52) U.S. Cl.
CPC ........... *F16H 37/046* (2013.01); *B60K 6/365* (2013.01); *B60K 6/48* (2013.01); *B60K 6/547* (2013.01); *F16H 3/006* (2013.01); *F16H 3/091* (2013.01); *F16H 3/10* (2013.01); *F16H 3/54* (2013.01); *F16H 3/724* (2013.01); *F16H 37/082* (2013.01); *B60K 2006/4816* (2013.01); *B60Y 2200/92* (2013.01); *F16H 2003/0822* (2013.01); *F16H 2003/0826* (2013.01); *F16H 2200/0047* (2013.01); *F16H 2200/0065* (2013.01); *F16H 2200/2005* (2013.01);
(Continued)

(58) Field of Classification Search
CPC ............ F16H 3/10; F16H 3/093; F16H 3/006
See application file for complete search history.

(56) References Cited

U.S. PATENT DOCUMENTS 9,623,744 B2 *  4/2017  Lee ........................ B60K 6/365
9,695,919 B2 *  7/2017  Lee ........................ F16H 37/046
(Continued)

*Primary Examiner* — Derek D Knight
(74) *Attorney, Agent, or Firm* — Lempia Summerfield Katz LLC

(57) ABSTRACT

A power transmission apparatus for a vehicle includes: an engine output shaft; a first transmission outputting torque shifted to two shift stages to a central output shaft; and a second transmission outputting torque shifted to multiple shift stages. The second transmission includes: a first input shaft disposed on the same shaft line as that of the central output shaft; a second input shaft disposed on an outer circumference of the first input shaft a third input shaft disposed in parallel with the first and second input shafts; an idle shaft disposed in parallel with the first and second input shafts and spaced apart from the first and second input shafts; and an output shaft disposed in parallel with the first and third input shafts and the idle shaft between the first and third input shafts and the idle shaft.

13 Claims, 8 Drawing Sheets

(51) Int. Cl.
*F16H 3/00* (2006.01)
*F16H 3/091* (2006.01)
*F16H 37/08* (2006.01)
*F16H 3/72* (2006.01)
*B60K 6/365* (2007.10)
*B60K 6/48* (2007.10)
*B60K 6/547* (2007.10)
*F16H 3/54* (2006.01)
*F16H 3/08* (2006.01)

(52) U.S. Cl.
CPC ..... *F16H 2200/2035* (2013.01); *Y10S 903/91* (2013.01); *Y10S 903/919* (2013.01)

(56) References Cited

U.S. PATENT DOCUMENTS 9,951,845 B2 * 4/2018 Hemphill ................ F16H 3/006
10,300,782 B2 * 5/2019 Cho ....................... B60K 6/547

* cited by examiner

FIG. 2

| DRIVING MODE | SHIFT STAGE | COUPLING ELEMENT | | | | SL1 | | | SL2 | | | SL3 | | OWC |
|---|---|---|---|---|---|---|---|---|---|---|---|---|---|---|
| | | CL1 | CL2 | ECL1 | B1 | D3 | N | D5 | D2 | N | D4 | N | Rev | |
| ENGINE DRIVING | REV2 | | △ | △ | | | ○ | | | ○ | | | ● | |
| | REV1 | | △ | | ● | | ○ | | | ○ | | | ● | |
| | N | | | | ● | | ○ | | | ○ | | ○ | | |
| | D1 | △ | | | ● | | ○ | | | ○ | | ○ | | ● |
| | D2 | | △ | | ● | | ○ | | ● | | | ○ | | |
| | D3 | △ | | | ● | ● | | | | ○ | | ○ | | |
| | D4 | | △ | | ● | | ○ | | | | ● | ○ | | |
| | D5 | △ | | | ● | | | ● | | ○ | | ○ | | |
| | D6 | | △ | △ | | | ○ | | ● | | | ○ | | |
| | D7 | △ | | △ | | ● | | | | ○ | | ○ | | |
| | D8 | | △ | △ | | | ○ | | | | ● | ○ | | |
| | D9 | △ | | △ | | | | ● | | ○ | | ○ | | |

△ : CLUTCH OPERATION
● : SHIFT POSITION
○ : NEUTRAL POSITION

FIG. 4

| DRIVING MODE | SHIFT STAGE | COUPLING ELEMENT ||||  SL1 ||| SL2 ||| SL3 || OWC | MG |
|---|---|---|---|---|---|---|---|---|---|---|---|---|---|---|---|
| | | CL1 | CL2 | ECL1 | B1 | D3 | N | D5 | D2 | N | D4 | N | Rev | | |
| ENGINE DRIVING | REV2 | | △ | △ | | | ○ | | | ○ | | | ● | | □ |
| | REV1 | | △ | | ● | | ○ | | | ○ | | | ● | | □ |
| | N | | | | ● | | ○ | | | ○ | | ○ | | | □ |
| | D1 | △ | | | ● | | ○ | | | ○ | | ○ | | ● | □ |
| | D2 | | △ | | ● | | ○ | | ● | | | ○ | | | □ |
| | D3 | △ | | | ● | ● | | | | ○ | | ○ | | | □ |
| | D4 | | △ | | ● | | ○ | | | | ● | ○ | | | □ |
| | D5 | △ | | | ● | | | ● | | ○ | | ○ | | | □ |
| | D6 | | △ | △ | | | ○ | | ● | | | ○ | | | □ |
| | D7 | △ | | △ | | ● | | | | ○ | | ○ | | | □ |
| | D8 | | △ | △ | | | ○ | | | | ● | ○ | | | □ |
| | D9 | △ | | △ | | | | ● | | ○ | | ○ | | | □ |
| EV DRIVING | e-REV | | △ | | | | ○ | | | ○ | | | ● | | ■ |
| | e-D1 | △ | | | | | ○ | | | ○ | | ○ | | ● | ■ |
| | e-D2 | | △ | | | | ○ | | ● | | | ○ | | | ■ |
| | e-D3 | △ | | | | ● | | | | ○ | | ○ | | | ■ |
| | e-D4 | | △ | | | | ○ | | | | ● | ○ | | | ■ |
| | e-D5 | △ | | | | | | ● | | ○ | | ○ | | | ■ |

△ : CLUTCH OPERATION   ● : SHIFT POSITION   ○ : NEUTRAL POSITION
■ : MG-ONLY DRIVING (EV)   □ : MG ASSIST DRIVING

FIG. 6

| DRIVING MODE | SHIFT STAGE | COUPLING ELEMENT ||||  SL1 ||| SL2 ||| SL3 || OWC | MG |
|---|---|---|---|---|---|---|---|---|---|---|---|---|---|---|---|
| | | CL1 | CL2 | ECL1 | B1 | D3 | N | D5 | D2 | N | D4 | N | Rev | | |
| ENGINE DRIVING | REV2 | | △ | | ● | | ○ | | | ○ | | | ● | | □ |
| | REV1 | | △ | △ | | | ○ | | | ○ | | | ● | | □ |
| | N | | | △ | | | ○ | | | ○ | | ○ | | | □ |
| | D1 | △ | | △ | | | ○ | | | ○ | | ○ | | ● | □ |
| | D2 | | △ | △ | | | ○ | | ● | | | ○ | | | □ |
| | D3 | △ | | △ | | ● | | | | ○ | | ○ | | | □ |
| | D4 | | △ | △ | | | ○ | | | | ● | ○ | | | □ |
| | D5 | △ | | △ | | | | ● | | ○ | | ○ | | | □ |
| | D6 | | △ | | ● | | ○ | | ● | | | ○ | | | □ |
| | D7 | △ | | | ● | ● | | | | ○ | | ○ | | | □ |
| | D8 | | △ | | ● | | ○ | | | | ● | ○ | | | □ |
| | D9 | △ | | | ● | | | ● | | ○ | | ○ | | | □ |
| EV DRIVING | e-REV | | △ | | | | ○ | | | ○ | | | ● | | ■ |
| | e-D1 | △ | | | | | ○ | | | ○ | | ○ | | ● | ■ |
| | e-D2 | | △ | | | | ○ | | ● | | | ○ | | | ■ |
| | e-D3 | △ | | | | ● | | | | ○ | | ○ | | | ■ |
| | e-D4 | | △ | | | | ○ | | | | ● | ○ | | | ■ |
| | e-D5 | △ | | | | | | ● | | ○ | | ○ | | | ■ |

△ : CLUTCH OPERATION   ● : SHIFT POSITION   ○ : NEUTRAL POSITION
■ : MG-ONLY DRIVING (EV)   □ : MG ASSIST DRIVING

FIG. 8

| DRIVING MODE | SHIFT STAGE | COUPLING ELEMENT | | | | | SL1 | | | SL2 | | | SL3 | | OWC | MG |
|---|---|---|---|---|---|---|---|---|---|---|---|---|---|---|---|---|
| | | CL1 | CL2 | ECL1 | ECL2 | B1 | D3 | N | D5 | D2 | N | D4 | N | Rev | | |
| ENGINE DRIVING / EV DRIVING | REV2 | | △ | △ | △ | | | ○ | | | ○ | | | ● | | □ |
| | REV1 | | △ | | △ | ● | | ○ | | | ○ | | | ● | | □ |
| | N | | | | △ | ● | | ○ | | | ○ | | ○ | | | □ |
| | D1 | △ | | | △ | ● | | ○ | | | ○ | | ○ | | ● | □ |
| | D2 | | △ | | △ | ● | | ○ | | ● | | | ○ | | | □ |
| | D3 | △ | | | △ | ● | ● | | | | ○ | | ○ | | | □ |
| | D4 | | △ | | △ | ● | | ○ | | | | ● | ○ | | | □ |
| | D5 | △ | | | △ | ● | | | ● | | ○ | | ○ | | | □ |
| | D6 | | △ | △ | △ | | | ○ | | ● | | | ○ | | | □ |
| | D7 | △ | | △ | △ | | ● | | | | ○ | | ○ | | | □ |
| | D8 | | △ | △ | △ | | | ○ | | | | ● | ○ | | | □ |
| | D9 | △ | | △ | △ | | | | ● | | ○ | | ○ | | | □ |

△ : CLUTCH OPERATION    ● : SHIFT POSITION    ○ : NEUTRAL POSITION
□ : MG ASSIST DRIVING AND EV DRIVING

※ RELEASE OF ENGINE CLUTCH (ECL2) IS REQUIRED AT THE TIME OF EV DRIVING

POWER TRANSMISSION APPARATUS FOR A VEHICLE

CROSS-REFERENCE TO RELATED APPLICATION

This application claims priority to and the benefit of Korean Patent Application No. 10-2017-0135813 filed in the Korean Intellectual Property Office on Oct. 19, 2017, the entire contents of which are incorporated herein by reference.

BACKGROUND

(a) Field of the Disclosure

The present disclosure relates to a power transmission apparatus for a vehicle. More particularly, the present disclosure relates to a power transmission apparatus for a vehicle capable of implementing fixed shift stages of nine forward speeds and two reverse speeds. The implementing is accomplished by driving of an engine and implementing shift stages of five forward speeds in an electric vehicle (EV) mode by additionally disposing one motor/generator.

(b) Description of the Related Art

Environmentally-friendly technology in vehicles is a key to survival for the future vehicle industry. Automakers have made every effort to develop environmentally-friendly vehicles that comply with environmental and fuel consumption regulations.

An example of the future vehicle technology may include an electric vehicle (EV) and a hybrid electric vehicle (HEV), both of which use electric energy. Another example of a future vehicle technology may include a dual clutch transmission (DCT) that has improved efficiency and convenience.

The DCT associated with the present disclosure includes two clutch devices in an automatic transmission and a gear train of a basic manual transmission. The DCT associated with the present disclosure also selectively transfers a torque input from an engine to two input shafts using two clutches. Additionally, the DCT associated with the present disclosure shifts the torque using the gear train described above and outputs the shifted torque.

The DCT has been used to compactly implement a high shift stage transmission of 5 shift stages or more. Additionally, the DCT has been implemented as an auto manual transmission (AMT) that makes a manual shift of a driver unnecessary by controlling the two clutches and synchronizing devices by a controller.

Therefore, the use of the DCT has been a prominent transmission option. Some reasons for choosing a DCT may include the fact that DCTs may comply with important implementation efficiency of more shift stages. DCT may also meet fuel consumption regulations due to power transfer efficiency advantages over automatic transmissions such as the planetary gear-type automatic transmission. Another advantage of the DCT is the ease of replacement and the addition of components depending on the implementation of more shift stages.

In addition, recently, the DCT has been used in hybrid electric vehicles by additionally disposing one or more planetary gear sets in the DCT to enable driving in an electric vehicle (EV) mode.

The above information disclosed in this Background section is only for enhancing the understanding of the background of the disclosure. Therefore, the Background section may contain information that does not form the prior art that is already known in this country to a person of ordinary skill in the art.

SUMMARY

The present disclosure is directed to providing a power transmission apparatus for a vehicle. The disclosed power transmission apparatus is capable of implementing fixed shift stages of nine forward speeds and two reverse speeds by driving of an engine and implementing shift stages of five forward speeds in an electric vehicle (EV) mode by additionally disposing one motor/generator.

Further, the present disclosure is directed to providing a power transmission apparatus for a vehicle capable of improving fuel consumption. The fuel consumption improvement may be obtained by realization of more shift stages through a simple configuration by implementing fixed shift stages of nine forward speeds and two reverse speeds by addition of one planetary gear set to a dual clutch transmission (DCT) structure that uses three synchronizers.

Further, the present disclosure provides a power transmission apparatus for a vehicle capable of improving mountability by disposing three synchronizers on separate shafts, respectively, to minimize electric fields.

An embodiment of the present disclosure provides a power transmission apparatus for a vehicle including an engine output shaft to which a torque of an engine is transferred. The power transmission apparatus also includes a first transmission shifting the torque input from the engine output shaft to two shift stages and outputting the torque shifted to the two shift stages to a central output shaft. The power transmission apparatus further includes a second transmission shifting the torque input from the central output shaft through two input paths to multiple shift stages and outputting the torque shifted to the multiple shift stages. The second transmission includes a first input shaft disposed on the same shaft line as that of with the central output shaft. The first input shaft is selectively connected to the central output shaft through a first clutch. The first input shaft includes one drive gear fixedly connected thereto and two drive gears selectively synchronously connected thereto through a first synchronizer. The second transmission further includes a second input shaft disposed on an outer circumference of the first input shaft so as to overlap the first input shaft without rotation interference. The second input shaft is selectively connected to the central output shaft through a second clutch. The second input shaft includes a central drive gear fixedly connected thereto. The second transmission also includes a third input shaft disposed in parallel with the first and second input shafts wherein the third input shaft is spaced apart from the first and second input shafts by predetermined intervals. The third input shaft includes a central driven gear fixedly connected thereto and two drive gears selectively synchronously connected thereto through a second synchronizer. The second transmission further includes an idle shaft disposed in parallel with the first and second input shafts wherein the idle shaft is spaced apart from the first and second input shafts by predetermined intervals. The idle shaft includes an idle gear transferring a torque of the second input shaft to the third input shaft. The idle shaft further includes a reverse drive gear selectively synchronously connected thereto through a third synchronizer. The second transmission also includes an output shaft disposed in parallel with the first and third input shafts and the idle shaft between the first and third input shafts and the idle shaft. The output shaft includes four driven gears externally connected, respectively, to the respective drive gears configured on the first and third input shafts. The idle shaft and an output gear transfer the shifted torque to a final reduction differential.

The first transmission may include a single pinion planetary gear set outputting the torque of the engine as two shift stages including a torque reduced as compared with the torque of the engine and the same torque as the torque of the engine.

The single pinion planetary gear set may include a sun gear, a single pinion planetary gear, and a ring gear. The sun gear may be fixedly connected to the engine output shaft and selectively connected to the planetary carrier through a first engine clutch. The planetary carrier may be fixedly connected to the central output shaft. The ring gear may be selectively connected to a transmission housing through a first brake.

The first transmission may include a single pinion planetary gear set outputting the torque of the engine as two shift stages. The two shift stages may include the same torque as the torque of the engine and a torque increased as compared with the torque of the engine.

The single pinion planetary gear set may include a sun gear fixedly connected to the central output shaft. The single pinion planetary gear set may also include a planetary carrier fixedly connected to the engine output shaft and selectively connected to the sun gear through a first engine clutch. The single pinion planetary gear set may further include a ring gear selectively connected to a transmission housing through a first brake.

The first input shaft may have a 1-speed drive gear fixedly connected to a distal end portion of a portion thereof penetrating through the second input shaft and exposed. The first input shaft may also have a 3/7-speed drive gear and a 5/9-speed drive gear disposed between the 1-speed drive gear and the second input shaft and selectively synchronously connected thereto by the first synchronizer.

The second input shaft may have the central drive gear connected integrally therewith at a distal end portion thereof to be externally engaged with the idle gear on the idle shaft.

The third input shaft may have the central driven gear fixedly connected to a front end portion thereof. The third input shaft may have a 2/6-speed drive gear and a 4/8-speed drive gear disposed behind the central driven gear and selectively synchronously connected thereto by the second synchronizer.

The idle shaft may have the idle gear fixedly connected to a front end portion thereof to be externally connected to the central drive gear of the second input shaft and the central driven gear of the third input shaft. The idle shaft may have the reverse drive gear disposed behind the idle gear and selectively synchronously connected to the idle shaft by the third synchronizer.

The output shaft may have a 1-speed driven gear, a 2/3/6/7-speed driven gear, a reverse driven gear, a 4/5/8/9-speed driven gear, and the output gear disposed thereon. The 1-speed driven gear may be externally connected to the 1-speed drive gear of the first input shaft and be connected to the output shaft through a one-way clutch. The 2/3/6/7-speed driven gear may be fixedly connected to the output shaft to be externally connected to the 3/7-speed drive gear and the 2/6-speed drive gear. The reverse driven gear may be fixedly connected to the output shaft to be externally connected to the reverse drive gear. The 4/5/8/9-speed driven gear may be fixedly connected to the output shaft to be externally connected to the 5/9-speed drive gear and the 4/8-speed drive gear. The output gear may be fixedly connected to a front end portion of the output shaft to be externally connected to a final reduction gear of the final reduction differential.

The first transmission may further include a motor/generator, which is fixedly connected to the planetary carrier.

The first transmission may further include a motor/generator, which is fixedly connected to the sun gear.

The first transmission may further include a motor/generator, which is fixedly connected to the engine output shaft. A second engine clutch may be disposed on the engine output shaft between the motor/generator and the engine.

In the power transmission apparatus according to a first embodiment of the present disclosure, the fixed shift stages of nine forward speeds and two reverse speeds may be implemented by adding one planetary gear set to a DCT structure that uses three synchronizers such that more shift stages may be realized to improve fuel consumption.

In addition, in the power transmission apparatus according to a first embodiment of the present disclosure, the shift stages of nine forward speeds and two reverse speeds may be implemented using three synchronizers and one planetary gear set such that an internal configuration may be simplified through a reduction in the number of components. Fuel consumption may be improved through minimization of weight.

Further, in the power transmission apparatus according to a first embodiment of the present disclosure, the three synchronizers are disposed on separate shafts, respectively, to minimize electric fields, thereby making it possible to improve mountability.

Further, in the power transmission apparatuses for a vehicle according to second and third embodiments of the present disclosure, the fixed shift stages of nine forward speeds and two reverse speeds by driving of the engine and the shift stages of five forward speeds in the EV mode may be implemented by additionally disposing one motor/generator in the power transmission apparatus according to a first embodiment of the present disclosure.

Further, in the power transmission apparatus for a vehicle according to a fourth embodiment of the present disclosure, the fixed shift stages of nine forward speeds and two reverse speeds by driving of the engine and the shift stages of five forward speeds and two reverse speed in the EV mode by driving of the motor/generator may be implemented, respectively, by additionally disposing one motor/generator and one engine clutch in the power transmission apparatus according to a first embodiment of the present disclosure.

Other effects that may be obtained or are predicted by an embodiment of the present disclosure are explicitly or implicitly described in a detailed description of the present disclosure. In other words, various effects that are predicted according to an embodiment of the present disclosure are described in the following detailed description.

BRIEF DESCRIPTION OF THE DRAWINGS

FIG. 2 is a shift operation table of the power transmission apparatus for a vehicle according to a first embodiment of the present disclosure.

FIG. 4 is a shift operation table of the power transmission apparatus for a vehicle according to a second embodiment of the present disclosure.

FIG. 6 is a shift operation table of the power transmission apparatus for a vehicle according to a third embodiment of the present disclosure.

FIG. 8 is a shift operation table of the power transmission apparatus for a vehicle according to a fourth embodiment of the present disclosure.

DETAILED DESCRIPTION OF THE EMBODIMENTS

Figure 1:
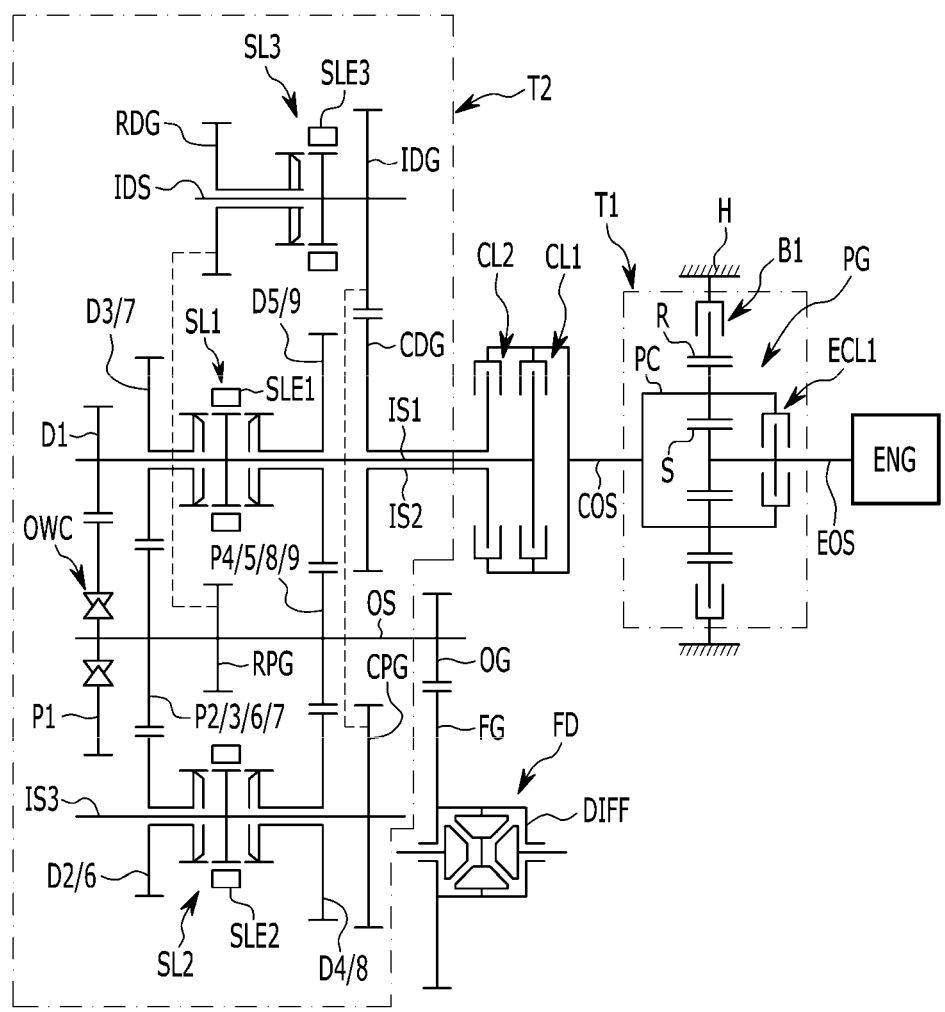
FIG. 1 is a configuration diagram of a power transmission apparatus for a vehicle according to a first embodiment of the present disclosure.

The present disclosure is described more fully hereinafter with reference to the accompanying drawings, in which embodiments of the disclosure are shown. The present disclosure may be implemented in various different forms and is not limited to the embodiments provided herein.

Portions unrelated to the description will be omitted to obviously describe the present disclosure, and similar reference numerals will be used to describe the same or similar portions throughout the specification.

In the following description, dividing names of components into first, second and the like is to differentiate the names because the names of the components are the same as each other. An order of such components is not intended by the use of such names. In the drawings and description, the following symbols are used to identify various elements of the disclosed embodiments, wherein:
  i. B1 represents a first brake;
  ii. EOS represents an engine output shaft;
  iii. CDG represents a central drive gear;
  iv. COS represents a central output shaft;
  v. CPG represents a central driven gear;
  vi. CL1, CL2 represent first and second clutch;
  vii. D1 represent a 1-speed drive gear;
  viii. D2/6 represent a 2/6-speed drive gear;
  ix. D3/7 represent a 3/7-speed drive gear;
  x. D4/8 represent a 4/8-speed drive gear;
  xi. D5/9 represent a 5/9-speed drive gear;
  xii. ECL1, ECL2 represent first and second engine clutch;
  xiii. H represents a transmission housing;
  xiv. IDG represents an idle gear;
  xv. IDS represents an idle shaft;
  xvi. IS1, IS2, IS3 represents first, second and third input shafts;
  xvii. OG represents an output gear;
  xviii. OS represents an output shaft;
  xix. OWC represents a one-way clutch;
  xx. P1 represents a 1-speed driven gear;
  xxi. P2/3/6/7 represents a 2/3/6/7-speed driven gear;
  xxii. P4/5/8/9 represents 4/5/8/9-speed driven gear;
  xxiii. PC represents a planetary carrier;
  xxiv. PG represents a planetary gear set;
  xxv. R represents a ring gear;
  xxvi. RDG represents a reverse drive gear;
  xxvii. RPG represents a reverse driven gear;
  xxviii. SL1, SL2, SL2 represent first, second and third synchronizers;
  xxix. T1 represent a first transmission; and
  xxx. T2 represent a second transmission.

FIG. 1 is a configuration diagram of a power transmission apparatus for a vehicle according to a first embodiment of the present disclosure.

Referring to FIG. 1, in the power transmission apparatus for a vehicle according to a first embodiment of the present disclosure, a torque of an engine ENG, which is a power source, is shifted to two shift stages in and is then output from a first transmission T1. The torque output from the first transmission T1 through two paths is shifted to fixed shift stages of nine forward speeds and two reverse speeds in and then output from a second transmission T2.

Various known engines such as an existing gasoline engine, a diesel engine, an engine using a fossil fuel or the like, may be used as the engine ENG, which is the power source.

In this embodiment, the first transmission T1 shifting the torque of the engine ENG to the two shift stages and outputting the shifted torque is configured to include a planetary gear set PG.

The planetary gear set PG, which is a single pinion planetary gear set, includes a sun gear S, a planetary carrier PC and a ring gear R. The planetary carrier PC is rotating and supporting a plurality of pinions externally engaged with the sun gear S. The ring gear R is internally engaged with the plurality of pinions.

The sun gear S, which is a constant input element, is fixedly connected to an engine output shaft EOS. The sun gear S is selectively connected to the planetary carrier PC through a first engine clutch ECL1. The planetary carrier PC, which is a constant output element, is fixedly connected to a central output shaft (COS). The ring gear R, which is a selective fixed element, is selectively connected to a transmission housing H through a first brake B1.

Therefore, when the first brake B1 is controlled to be operated in a state in which an input is conducted to the sun gear S, a reduced torque is output through the planetary carrier PC. When a first engine clutch ECL1 is controlled to be operated, the entire planetary gear set PG integrally rotates, such that the same torque is output through the planetary carrier PC.

The second transmission T2 receiving the torque from the central output shaft COS through the two paths includes a first and a second input shafts IS1 and IS2 disposed to overlap each other without rotation interference therebetween. The second transmission T2 also includes an output shaft OS disposed in parallel with the first and second input shafts IS1 and IS2 wherein the output shaft OS is spaced apart from the first and second input shafts IS1 and IS2 by predetermined intervals. The second transmission T2 further includes an idle shaft IDS disposed in parallel with the first and second input shafts IS1 and IS2 and the output shaft OS between the first and second input shafts IS1 and IS2 and the output shaft OS. The second transmission T2 also includes a third input shaft IS3 disposed in parallel with the output shaft OS and the idle shaft IDS between the output shaft OS and the idle shaft IDS. The second transmission T2 further includes a plurality of gears disposed on the five axes IS1, IS2, IS3, IDS, and OS.

The first input shaft IS1 is formed of a real shaft and is selectively connected to the central output shaft COS through a first clutch CL1 to transfer a torque related to odd shift stages.

The second input shaft IS2 is formed of a hollow shaft and is disposed on an outer circumference of the first input shaft IS1 to overlap the first input shaft IS1 without rotation interference. The second input shaft IS2 is selectively connected to the central output shaft COS through a second clutch CL2 to transfer a torque related to even shift stages and a reverse shift stage.

In the first input shaft IS1, a 1-speed drive gear D1, a 3/7-speed drive gear D3/7, a 5/9-speed drive gear D5/9 and a first synchronizer SL1 are disposed on a portion of the first input shaft IS1 penetrating through the second input shaft IS2 and exposed.

The 1-speed drive gear D1 is fixedly connected to a distal end portion of the first input shaft IS1.

The 3/7-speed drive gear D3/7 and the 5/9-speed drive gear D5/9 are rotatably disposed on the first input shaft IS1 between the 1-speed drive gear D1 and the second input shaft IS2. The first synchronizer SL1 selectively synchronously connects the 3/7-speed drive gear D3/7 and the 5/9-speed drive gear D5/9 to the first input shaft IS1.

A central drive gear CDG is fixedly connected to the second input shaft IS2. The central drive gear CDG transfers a torque of the central output shaft COS to the third input shaft IS3 through the idle shaft IDS.

The third input shaft IS3 is disposed in parallel with the first and second input shafts IS1 and IS2 wherein the third input shaft IS3 is spaced apart from the first and second input shafts IS1 and IS2 by predetermined intervals. The third input shaft IS3 includes a central driven gear CPG, a 2/6-speed drive gear D2/6, a 4/8-speed drive gear D4/8 and a second synchronizer SL2 disposed thereon.

The central driven gear CPG is fixedly connected to a front end portion of the third input shaft IS3.

The 2/6-speed drive gear D2/6 and the 4/8-speed drive gear D4/8 are rotatably disposed on the third input shaft IS3 behind the central driven gear CPG. The second synchronizer SL2 selectively synchronously connects the 2/6-speed drive gear D2/6 and the 4/8-speed drive gear D4/8 to the third input shaft IS3.

The idle shaft IDS is disposed in parallel with the first and second input shaft IS1 and IS2 wherein the idle shaft IDS is spaced apart from the first and second input shaft IS1 and IS2 by predetermined intervals. An idle gear IDG, a reverse drive gear RDG and a third synchronizer SL3 are disposed on the idle shaft IDS.

The idle gear IDG is fixedly connected to a front end portion of the idle shaft IDS to be externally connected to the central drive gear CDG of the second input shaft IS2 and the central driven gear CPG of the third input shaft IS3.

The reverse drive gear RDG is rotatably disposed on the idle shaft IDS. The third synchronizer SL3 selectively synchronously connects the reverse drive gear RDG to the idle shaft IDS.

The output shaft OS is disposed in parallel with the first, second, and third input shafts IS1, IS2, and IS3 wherein the output shaft OS is spaced apart from the first, second, and third input shafts IS1, IS2, and IS3 by predetermined intervals.

A 1-speed driven gear P1, a 2/3/6/7-speed driven gear P2/3/6/7, a reverse driven gear RPG, a 4/5/8/9-speed driven gear P4/5/8/9 and an output gear OG are configured integrally with the output shaft OS on the output shaft OS.

The 1-speed driven gear P1 is externally connected to the 1-speed drive gear D1 and is connected to the output shaft OS with a one-way clutch OWC interposed therebetween. The one-way clutch OWC is operated to transfer a torque in only forward 1-speed.

The 2/3/6/7-speed driven gear P2/3/6/7 is fixedly connected to the output shaft OS. The 2/3/6/7-speed driven gear P2/3/6/7 is externally connected to the 3/7-speed drive gear D3/7 and the 2/6-speed drive gear D2/6 to transfer torques of 2/3/6/7-speed transferred from the 3/7-speed drive gear D3/7 and the 2/6-speed drive gear D2/6 to the output shaft OS.

The reverse driven gear RPG is fixedly connected to the output shaft OS. The reverse driven gear RPG is externally connected to the reverse drive gear RDG of the idle shaft IDS to transfer a reverse torque transferred from the reverse drive gear RDG to the output shaft OS.

The 4/5/8/9-speed driven gear P4/5/8/9 is fixedly connected to the output shaft OS. The 4/5/8/9-speed driven gear P4/5/8/9 is externally connected to the 5/9-speed drive gear D5/9 and the 4/8-speed drive gear D4/8 to transfer torques of 4/5/8/9-speed transferred from the 5/9-speed drive gear D5/9 and the 4/8-speed drive gear D4/8 to the output shaft OS.

The output gear OG is fixedly connected to one end portion of output shaft OS and a final reduction gear FG of a final reduction differential FD including a differential DIFF.

In this embodiment, the first and second clutches CL1 and CL2, the first engine clutch ECL1, and the first brake B1, which are coupling elements, are hydraulic friction coupling units operated by a hydraulic pressure supplied by a hydraulic control apparatus are mainly multi-plate wet hydraulic friction coupling units, but may be coupling units that may be operated depending on electrical signals supplied from an electronic control apparatus, such as a multi-plate dry clutch.

In addition, since the first, second and third synchronizers SL1, SL2, and SL3 are the known components, a detailed description therefor will be omitted. The first, second, and third sleeves SLE1, SLE2, and SLE3 used in the first, second, and third synchronizers SL1, SL2, and SL3 include separate actuators (not shown) as known. The actuators perform a shift while being controlled by a transmission control unit.

FIG. 2 is a shift operation table of the power transmission apparatus for a vehicle according to a first embodiment of the present disclosure. Shift processes are described with reference to FIG. 2.

[Forward 1-speed]

In forward 1-speed D1, as shown in FIG. 2, the first clutch CL1 and the first brake B1 are controlled to be operated.

In this embodiment, the torque of the engine ENG is reduced in the first transmission T1 by the operation of the first brake B1. The torque is then output to the final reduction differential FD through the central output shaft COS, the first clutch CL1, the first input shaft IS1, the 1-speed drive gear D1, the 1-speed driven gear P1, the one-way clutch OWC, the output shaft OS and the output gear OG, such that forward 1-speed driving is performed.

[Forward 2-speed]

In forward 2-speed D2, as shown in FIG. 2, the 2/6-speed drive gear D2/6 and the third input shaft IS3 are connected to each other through the sleeve SLE2 of the second synchronizer SL2. The second clutch CL2 and the first brake B1 are operated.

In this embodiment, the torque of the engine ENG is reduced in the first transmission T1 by the operation of the first brake B1. The torque of the engine ENG is then output to the final reduction differential FD through the central output shaft COS, the second clutch CL2, the second input shaft IS2, the central drive gear CDG, the idle gear IDG, the central driven gear CPG, the third input shaft IS3, the 2/6-speed drive gear D2/6, the 2/3/6/7-speed driven gear P2/3/6/7, the output shaft OS and the output gear OG, such that forward 2-speed driving is performed.

[Forward 3-speed]

In forward 3-speed D3, as shown in FIG. 2, the 3/7-speed drive gear D3/7 and the first input shaft IS1 are synchronously connected to each other through the sleeve SLE1 of the first synchronizer SL1. The first clutch CL1 and the first brake B1 are operated.

In this embodiment, the torque of the engine ENG is reduced in the first transmission T1 by the operation of the first brake B1. The torque of the engine ENG is then output to the final reduction differential FD through the central output shaft COS, the first clutch CL1, the first input shaft IS1, the 3/7-speed drive gear D3/7, the 2/3/6/7-speed driven gear P2/3/6/7, the output shaft OS and the output gear OG, such that forward 3-speed driving is performed.

[Forward 4-speed]

In forward 4-speed D4, as shown in FIG. 2, the 4/8-speed drive gear D4/8 and the third input shaft IS3 are connected to each other through the sleeve SLE2 of the second synchronizer SL2. The second clutch CL2 and the first brake B1 are operated.

In this embodiment, the torque of the engine ENG is reduced in the first transmission T1 by the operation of the first brake B1. The torque of the engine ENG is then output to the final reduction differential FD through the central output shaft COS, the second clutch CL2, the second input shaft IS2, the central drive gear CDG, the idle gear IDG, the central driven gear CPG, the third input shaft IS3, the 4/8-speed drive gear D4/8, the 4/5/8/9-speed driven gear P4/5/8/9, the output shaft OS and the output gear OG, such that forward 4-speed driving is performed.

[Forward 5-speed]

In forward 5-speed D5, as shown in FIG. 2, the 5/9-speed drive gear D5/9 and the first input shaft IS1 are synchronously connected to each other through the sleeve SLE1 of the first synchronizer SL1. The first clutch CL1 and the first brake B1 are operated.

In this embodiment, the torque of the engine ENG is reduced in the first transmission T1 by the operation of the first brake B1. The torque of the engine ENG is then output to the final reduction differential FD through the central output shaft COS, the first clutch CL1, the first input shaft IS1, the 5/9-speed drive gear D5/9, the 4/5/8/9-speed driven gear P4/5/8/9, the output shaft OS, and the output gear OG, such that forward 5-speed driving is performed.

[Forward 6-speed]

In forward 6-speed D6, as shown in FIG. 2, the 2/6-speed drive gear D2/6 and the third input shaft IS3 are connected to each other through the sleeve SLE2 of the second synchronizer SL2, and the second clutch CL2. The first engine clutch ECL1 are operated.

In this embodiment, the first transmission T1 integrally rotates by the operation of the first engine clutch ECL1. Therefore, the same torque as the torque of the engine ENG is output. The same torque is then output to the final reduction differential FD through the central output shaft COS, the second clutch CL2, the second input shaft IS2, the central drive gear CDG, the idle gear IDG, the central driven gear CPG, the third input shaft IS3, the 2/6-speed drive gear D2/6, the 2/3/6/7-speed driven gear P2/3/6/7, the output shaft OS, and the output gear OG, such that forward 6-speed driving is performed.

[Forward 7-speed]

In forward 7-speed D7, as shown in FIG. 2, the 3/7-speed drive gear D3/7 and the first input shaft IS1 are synchronously connected to each other through the sleeve SLE1 of the first synchronizer SL1. The first clutch CL1 and the first engine clutch ECL1 are operated.

In this embodiment, the first transmission T1 integrally rotates by the operation of the first engine clutch ECL1. Therefore, the same torque as the torque of the engine ENG is output. The same torque is then output to the final reduction differential FD through the central output shaft COS, the first clutch CL1, the first input shaft IS1, the 3/7-speed drive gear D3/7, the 2/3/6/7-speed driven gear P2/3/6/7, the output shaft OS, and the output gear OG, such that forward 7-speed driving is performed.

[Forward 8-speed]

In forward 8-speed D8, as shown in FIG. 2, the 4/8-speed drive gear D4/8 and the third input shaft IS3 are connected to each other through the sleeve SLE2 of the second synchronizer SL2. The second clutch CL2 and the first engine clutch ECL1 are operated.

In this embodiment, the first transmission T1 integrally rotates by the operation of the first engine clutch ECL1. Therefore, the same torque as the torque of the engine ENG is output. The same torque may then be output to the final reduction differential FD through the central output shaft COS, the second clutch CL2, the second input shaft IS2, the central drive gear CDG, the idle gear IDG, the central driven gear CPG, the third input shaft IS3, the 4/8-speed drive gear D4/8, the 4/5/8/9-speed driven gear P4/5/8/9, the output shaft OS and the output gear OG, such that forward 8-speed driving is performed.

[Forward 9-speed]

In forward 9-speed D9, as shown in FIG. 2, the 5/9-speed drive gear D5/9 and the first input shaft IS1 are synchronously connected to each other through the sleeve SLE1 of the first synchronizer SL1 and the first clutch CL1. The first engine clutch ECL1 are operated.

In this embodiment, the first transmission T1 integrally rotates by the operation of the first engine clutch ECL1. Therefore, the same torque as the torque of the engine ENG is output. The same torque is then output to the final reduction differential FD through the central output shaft COS, the first clutch CL1, the first input shaft IS1, the 5/9-speed drive gear D5/9, the 4/5/8/9-speed driven gear P4/5/8/9, the output shaft OS and the output gear OG, such that forward 9-speed driving is performed.

[Reverse 1-speed]

In reverse 1-speed REV1, as shown in FIG. 2, the reverse drive gear RDG and the idle shaft IDS are synchronously connected to each other through the sleeve SLE3 of the third synchronizer SL3. The second clutch CL2 and the first brake B1 are operated.

In this case, the torque of the engine ENG is reduced in the first transmission T1 by the operation of the first brake B1. The torque of the engine ENG is then output to the final reduction differential FD through the central output shaft COS, the second clutch CL2, the second input shaft IS2, the central drive gear CDG, the idle gear IDG, the idle shaft IDS, the reverse drive gear RDG, the reverse driven gear RPG, the output shaft OS and the output gear OG in a reverse rotation direction, such that reverse 1-speed driving is performed.

[Reverse 2-speed]

In reverse 2-speed REV2, as shown in FIG. 2, the reverse drive gear RDG and the idle shaft IDS are connected to each other through the sleeve SLE3 of the third synchronizer SL3. The second clutch CL2 and the first engine clutch ECL1 are operated.

In this embodiment, the first transmission T1 integrally rotates by the operation of the first engine clutch ECL1. Therefore, the same torque as the torque of the engine ENG is output. The same torque is then output to the final reduction differential FD through the central output shaft COS, the second clutch CL2, the second input shaft IS2, the central drive gear CDG, the idle gear IDG, the idle shaft IDS, the reverse drive gear RDG, the reverse driven gear RPG, the output shaft OS, and the output gear OG in a reverse rotation direction, such that reverse 2-speed driving is performed.

In the description of the shift processes as described above, only current operation states of the respective shift stages are described. When sequential shifts up to higher shift stages are performed, synchronizers associated with the next higher shift stages may be preliminarily operated. When sequential shifts up to lower shift stages are performed, synchronizers associated with the next lower shift stages may be preliminarily operated.

Figure 3:
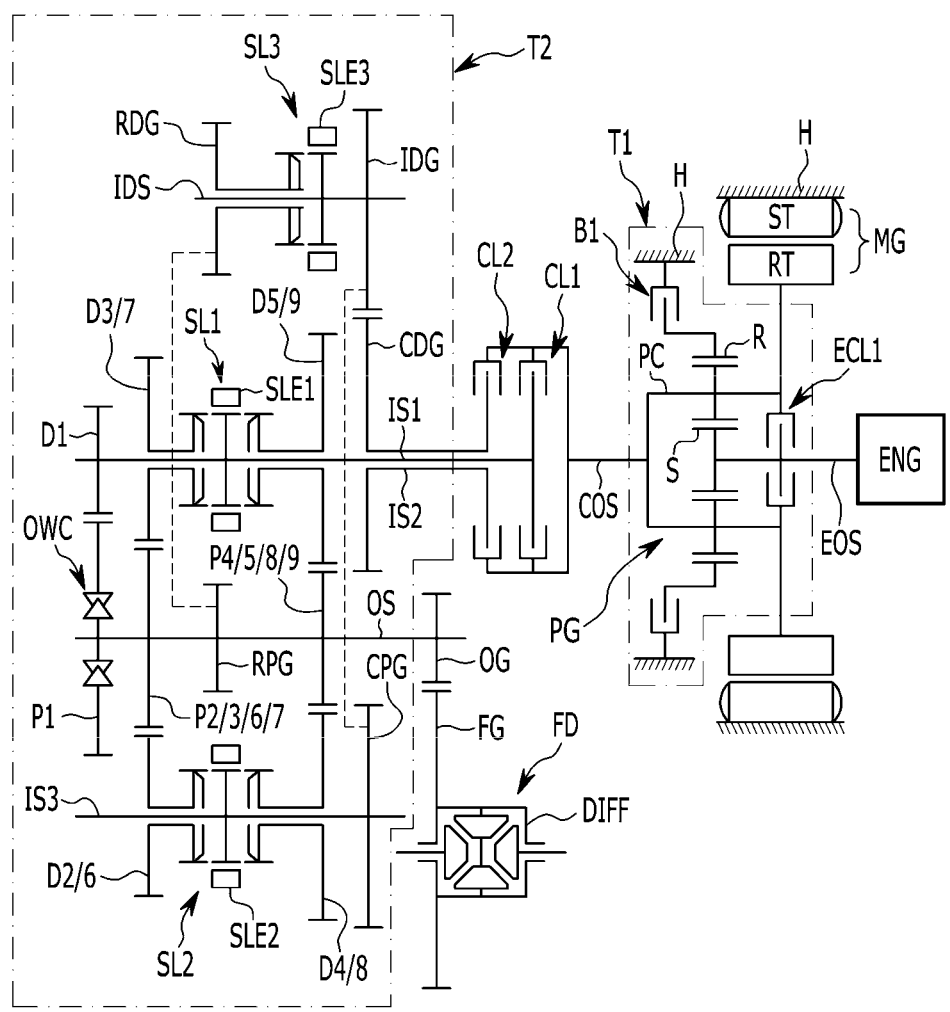
FIG. 3 is a configuration diagram of a power transmission apparatus for a vehicle according to a second embodiment of the present disclosure.

FIG. 3 is a configuration diagram of a power transmission apparatus for a vehicle according to a second embodiment of the present disclosure.

Referring to FIG. 3, in the first embodiment of the present disclosure described above, the power transmission apparatus is disclosed that may implement shift stages of nine forward speeds and two reverse speeds by the torque of the engine ENG. In a second embodiment, a motor/generator MG, which is an auxiliary power source, is additionally disposed in the power transmission apparatus according to the first embodiment to enable driving in an electric vehicle (EV) mode.

The motor/generator MG serves as a motor and a generator as known. The motor/generator MG is configured to include a stator ST fixed to the transmission housing H and a rotor RT rotatably supported inside the stator ST in a radial direction. The rotor RT is fixedly connected to the planetary carrier PC of the first transmission T1.

FIG. 4 is a shift operation table of the power transmission apparatus for a vehicle according to a second embodiment of the present disclosure. Various shift processes are described below with reference to FIG. 4.

Referring to FIG. 4, in fixed shift stages of nine forward speeds and two reverse speeds by the torque of the engine ENG as in the first embodiment, torque assist driving is enabled by the motor/generator MG, but the same shift processes are performed. A detailed description for the shift processes is thus omitted.

However, while driving in the EV mode, shifts of five forward speeds and one reverse speed are performed by a torque of the motor/generator MG without using the torque of the engine ENG. A description is provided below with reference to FIGS. 3 and 4.

[EV Forward 1-speed]

In EV forward 1-speed e-D1, as shown in FIG. 4, the first clutch CL1 is controlled to be operated.

In this embodiment, the torque of the motor/generator MG is output to the final reduction differential FD through the planetary carrier PC, the central output shaft COS, the first clutch CL1, the first input shaft IS1, the 1-speed drive gear D1, the 1-speed driven gear P1, the one-way clutch OWC, the output shaft OS and the output gear OG, such that EV forward 1-speed driving is performed.

[EV Forward 2-speed]

In EV forward 2-speed e-D2, as shown in FIG. 4, the 2/6-speed drive gear D2/6 and the third input shaft IS3 are connected to each other through the sleeve SLE2 of the second synchronizer SL2, and the second clutch CL2 is operated.

In this embodiment, the torque of the motor/generator MG is output to the final reduction differential FD through the planetary carrier PC, the central output shaft COS, the second clutch CL2, the second input shaft IS2, the central drive gear CDG, the idle gear IDG, the central driven gear CPG, the third input shaft IS3, the 2/6-speed drive gear D2/6, the 2/3/6/7-speed driven gear P2/3/6/7, the output shaft OS, and the output gear OG, such that EV forward 2-speed driving is performed.

[EV Forward 3-speed]

In EV forward 3-speed e-D3, as shown in FIG. 4, the 3/7-speed drive gear D3/7 and the first input shaft IS1 are synchronously connected to each other through the sleeve SLE1 of the first synchronizer SL1. The first clutch CL1 is operated.

In this embodiment, the torque of the motor/generator MG is output to the final reduction differential FD through the planetary carrier PC, the central output shaft COS, the first clutch CL1, the first input shaft IS1, the 3/7-speed drive gear D3/7, the 2/3/6/7-speed driven gear P2/3/6/7, the output shaft OS and the output gear OG, such that EV forward 3-speed driving is performed.

[EV Forward 4-speed]

In EV forward 4-speed e-D4, as shown in FIG. 4, the 4/8-speed drive gear D4/8 and the third input shaft IS3 are connected to each other through the sleeve SLE2 of the second synchronizer SL2, and the second clutch CL2 is operated.

In this embodiment, the torque of the motor/generator MG is output to the final reduction differential FD through the planetary carrier PC, the central output shaft COS, the second clutch CL2, the second input shaft IS2, the central drive gear CDG, the idle gear IDG, the central driven gear CPG, the third input shaft IS3, the 4/8-speed drive gear D4/8, the 4/5/8/9-speed driven gear P4/5/8/9, the output shaft OS and the output gear OG, such that EV forward 4-speed driving is performed.

[EV Forward 5-speed]

In EV forward 5-speed e-D5, as shown in FIG. 4, the 5/9-speed drive gear D5/9 and the first input shaft IS1 are synchronously connected to each other through the sleeve SLE1 of the first synchronizer SL1. The first clutch CL1 is operated.

In this embodiment, the torque of the motor/generator MG is output to the final reduction differential FD through the planetary carrier PC, the central output shaft COS, the first clutch CL1, the first input shaft IS1, the 5/9-speed drive gear D5/9, the 4/5/8/9-speed driven gear P4/5/8/9, the output shaft OS and the output gear OG, such that EV forward 5-speed driving is performed.

[EV Reverse]

In EV reverse e-REV, as shown in FIG. 4, the reverse drive gear RDG and the idle shaft IDS are connected to each other through the sleeve SLE3 of the third synchronizer SL3. The second clutch CL2 is operated.

In this embodiment, the torque of the torque of the motor/generator MG is output to the final reduction differential FD through the planetary carrier PC, the central output shaft COS, the second clutch CL2, the second input shaft IS2, the central drive gear CDG, the idle gear IDG, the idle shaft IDS, the reverse drive gear RDG, the reverse driven gear RPG, the output shaft OS and the output gear OG in a reverse rotation direction, such that EV reverse driving is performed.

Figure 5:
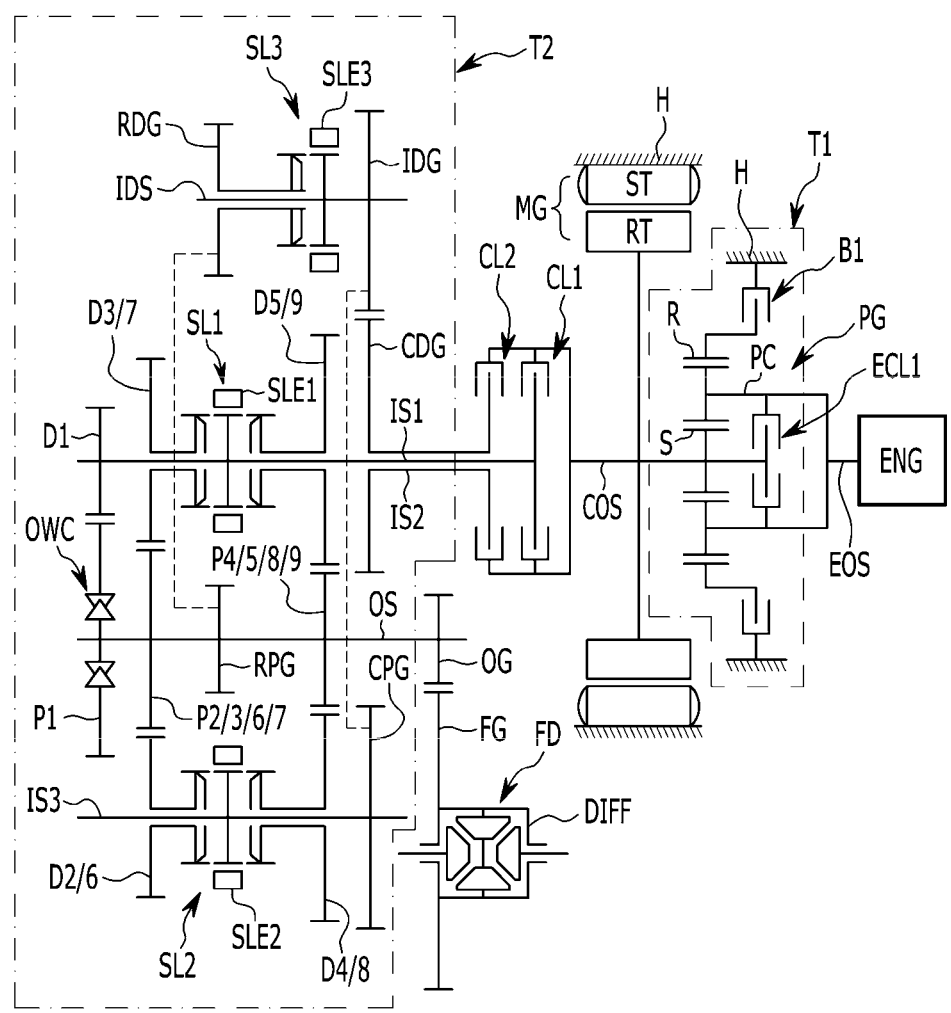
FIG. 5 is a configuration diagram of a power transmission apparatus for a vehicle according to a third embodiment of the present disclosure.

FIG. 5 is a configuration diagram of a power transmission apparatus for a vehicle according to a third embodiment of the present disclosure.

Referring to FIG. 5, in the second embodiment of the present disclosure, the torque of the engine ENG may be shifted to the reduced torque or the same torque in the first transmission T1 and then be output. However, in a third embodiment, the torque of the engine is shifted to the same torque or an increased torque in the first transmission and is then output.

To this end, in a third embodiment, the sun gear S of the planetary gear set PG constituting the first transmission T1 is fixedly connected to the central output shaft COS. Additionally, the planetary carrier PC is fixedly connected to the engine output shaft EOS and is selectively connected to the sun gear S through the first engine clutch ECL1. The ring gear R is also selectively connected to the transmission housing H through the first brake 131.

In addition, the rotor RT of the motor/generator MG is fixedly connected to the central output shaft COS.

Therefore, in the first transmission T1, the first engine clutch ECL1 is controlled to be operated, such that the torque of the engine ENG input to the first transmission T1 is output to the central output shaft COS as it is. Alternatively, the first brake B1 is controlled to be operated, such that the torque of the engine ENG is increased and then output.

In addition, the torque of the motor/generator MG is directly transferred to the central output shaft COS.

In the third embodiment as described above, only an output condition of the torque output from the first transmission T1 is different from that in the second embodiment. Fixed shift stages of nine forward speeds and two reverse speeds by a torque assist from the motor/generator MG may be implemented as in the second embodiment. Additionally, the shift is performed so as to enable the driving in the EV mode of five forward speeds and one reverse speed by the torque of the motor/generator MG, which is the auxiliary power source.

FIG. 6 is a shift operation table of the power transmission apparatus for a vehicle according to a third embodiment of the present disclosure. Various shift processes are described below with reference to FIG. 6.

Referring to FIG. 6, in the third embodiment, the first brake B1 is controlled to be operated in forward 1-speed, 2-speed, 3-speed, 4-speed, and 5-speed and reverse 1-speed in order to reduce the torque of the engine ENG. The first engine clutch ECL1 is controlled to be operated in forward 6-speed, 7-speed, 8-speed, and 9-speed and reverse 2-speed in order to output the same torque.

However, in the third embodiment, shift processes except for an output condition in which the first engine clutch ECL1 is controlled to be operated in forward 1-speed, 2-speed, 3-speed, 4-speed, and 5-speed and reverse 1-speed in order to output the same torque as the torque of the engine ENG and the first brake B1 is controlled to be operated in forward 6-speed, 7-speed, 8-speed, and 9-speed and reverse 2-speed in order to increase the torque of the engine ENG are the same as those of FIG. 4. Thus, a detailed description therefor is omitted.

Figure 7:
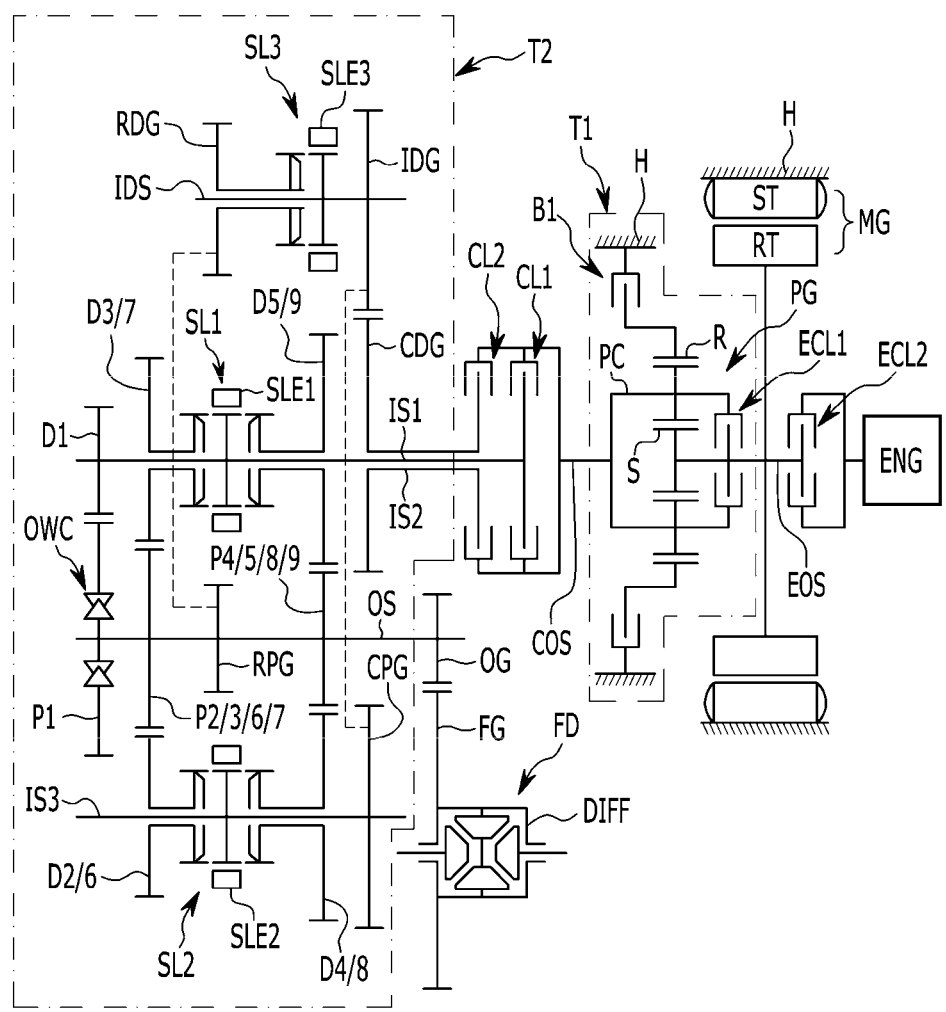
FIG. 7 is a configuration diagram of a power transmission apparatus for a vehicle according to a fourth embodiment of the present disclosure.

FIG. 7 is a configuration diagram of a power transmission apparatus for a vehicle according to a fourth embodiment of the present disclosure.

Referring to FIG. 7, in the first embodiment of the present disclosure described above, the power transmission apparatus that may implement shift stages of nine forward speeds and two reverse speeds by the torque of the engine ENG is disclosed. However, in a fourth embodiment, a motor/generator MG, which is an auxiliary power source, and a second engine clutch ECL2 are additionally disposed in the power transmission apparatus according to the first embodiment to implement shift stages of nine forward speeds and two reverse speeds in an EV mode.

The motor/generator MG serve as a motor and a generator as known. The motor/generator MG includes a stator ST fixed to the transmission housing H and a rotor RT rotatably supported inside the stator ST in a radial direction.

In disposing the motor/generator MG and the second engine clutch ECL2, the rotor RT of the motor/generator MG is disposed on the engine output shaft EOS. The second engine clutch ECL2 is disposed on the engine output shaft EOS between the motor/generator MG and the engine ENG.

Therefore, the torque of the engine ENG is transferred to the engine output shaft EOS only when the second engine clutch ECL2 is operated, thereby making it possible to prevent the torque of the motor/generator MG from being transferred to the engine ENG in the EV mode in which only the motor/generator MG is driven.

FIG. 8 is a shift operation table of the power transmission apparatus for a vehicle according to a fourth embodiment of the present disclosure. Various shift processes are described below with reference to FIG. 8.

Referring to FIG. 8, the power transmission apparatus according to a fourth embodiment, may perform driving in fixed shift stages of nine forward speeds and two reverse speeds by the torque of the engine ENG and fixed shift stages of nine forward speeds and two reverse speeds in the EV mode by the torque of the motor/generator MG.

In the power transmission apparatus according to a fourth embodiment, in the fixed shift stages of nine forward speeds and two reverse speeds by the torque of the engine ENG, only an operation of the second engine clutch CL2 is added as compared with the first embodiment (see FIG. 2). A shift is performed by the same shift processes. In this embodiment, torque assist driving by the motor/generator MG is enabled.

In addition, in the power transmission apparatus according to a fourth embodiment, an operation of the second engine clutch ECL2 is released in the EV mode by the torque of the motor/generator MG. A power source is changed from the engine ENG into the motor/generator MG. However, the shift processes of nine forward speeds and two reverse speeds are the same as the shift processes by the torque of the engine ENG, and thus, a detailed description therefor is omitted.

As described above, in the power transmission apparatus for a vehicle according to a first embodiment of the present disclosure, the fixed shift stages of nine forward speeds and two reverse speeds may be implemented by adding one planetary gear set to a DCT structure that uses three synchronizers such that more shift stages may be realized to improve fuel consumption.

In addition, in the power transmission apparatus for a vehicle according to a first embodiment of the present disclosure, the shift stages of nine forward speeds and two reverse speeds may be implemented using three synchronizers and one planetary gear set. As a result, an internal configuration may be simplified through a reduction in the number of components. Fuel consumption may be improved through minimization of weight.

Further, in the power transmission apparatus for a vehicle according to a first embodiment of the present disclosure, the three synchronizers are disposed on separate shafts, respectively, to minimize electric fields. Thereby, improvements in mountability are possible.

Further, in the power transmission apparatuses for a vehicle according to second and third embodiments of the present disclosure, the fixed shift stages of nine forward speeds and two reverse speeds by driving of the engine and the shift stages of five forward speeds and one reverse speed in the EV mode may be implemented by additionally disposing one motor/generator in the power transmission apparatus for a vehicle according to a first embodiment of the present disclosure.

Further, in the power transmission apparatus for a vehicle according to fourth embodiment of the present disclosure, the fixed shift stages of nine forward speeds and two reverse speeds by driving of the engine and the shift stages of nine forward speeds and two reverse speeds in the EV mode by driving of the motor/generator may be implemented, respectively. This can be accomplished by additionally disposing one motor/generator and one engine clutch in the power transmission apparatus for a vehicle according to a first embodiment of the present disclosure.

While this disclosure has been described in connection with what are presently considered to be practical embodiments, it is to be understood that the disclosure is not limited to the disclosed embodiments. On the contrary, this disclosure is intended to cover various modifications and equivalent arrangements included within the spirit and scope of the appended claims.

What is claimed is:

1. A power transmission apparatus for a vehicle, the power transmission apparatus comprising:
   an engine output shaft to which a torque of an engine is transferred;
   a first transmission shifting the torque input from the engine output shaft to two shift stages and outputting the torque shifted to the two shift stages to a central output shaft; and
   a second transmission shifting the torque input from the central output shaft through two input paths to multiple shift stages and outputting the torque shifted to the multiple shift stages,
   wherein the second transmission includes:
   a first input shaft disposed on the same shaft line as that of the central output shaft, selectively connected to the central output shaft through a first clutch, and including one drive gear fixedly connected thereto and two drive gears selectively synchronously connected thereto through a first synchronizer;
   a second input shaft disposed on an outer circumference of the first input shaft so as to overlap the first input shaft without rotation interference, selectively connected to the central output shaft through a second clutch, and including a central drive gear fixedly connected thereto;
   a third input shaft disposed in parallel with the first and second input shafts wherein the third input shaft is spaced apart from the first and second input shafts by predetermined intervals and including a central driven gear fixedly connected thereto and two drive gears selectively synchronously connected thereto through a second synchronizer;
   an idle shaft disposed in parallel with the first and second input shafts wherein the idle shaft is spaced apart from the first and second input shafts by predetermined intervals and including an idle gear transferring a torque of the second input shaft to the third input shaft and a reverse drive gear selectively synchronously connected thereto through a third synchronizer; and
   an output shaft disposed in parallel with the first and third input shafts and the idle shaft between the first and third input shafts and the idle shaft and including four driven gears externally connected, respectively, to the respective drive gears configured on the first and third input shafts and the idle shaft and an output gear transferring the shifted torque to a final reduction differential.

2. The power transmission apparatus of claim 1, wherein:
   the first transmission includes a single pinion planetary gear set outputting the torque of the engine as two shift stages including a torque reduced as compared with the torque of the engine and the same torque as the torque of the engine.

3. The power transmission apparatus of claim 2, wherein:
   the single pinion planetary gear set includes a sun gear fixedly connected to the engine output shaft and selectively connected to a planetary carrier through a first engine clutch, the planetary carrier fixedly connected to the central output shaft, and a ring gear selectively connected to a transmission housing through a first brake.

4. The power transmission apparatus of claim 1, wherein:
   the first transmission includes a single pinion planetary gear set outputting the torque of the engine as two shift stages including the same torque as the torque of the engine and including a torque increased as compared with the torque of the engine.

5. The power transmission apparatus of claim 4, wherein:
   the single pinion planetary gear set includes a sun gear fixedly connected to the central output shaft, a planetary carrier fixedly connected to the engine output shaft and selectively connected to the sun gear through a first engine clutch, and a ring gear selectively connected to a transmission housing through a first brake.

6. The power transmission apparatus of claim 1, wherein:
   the first input shaft has a 1-speed drive gear fixedly connected to a distal end portion of a portion thereof penetrating through the second input shaft, and has a 3/7-speed drive gear and a 5/9-speed drive gear disposed between the 1-speed drive gear and the second input shaft and selectively synchronously connected thereto by the first synchronizer.

7. The power transmission apparatus of claim 6, wherein:
   the second input shaft has the central drive gear connected integrally therewith at a distal end portion thereof to be externally gear-meshed with the idle gear on the idle shaft.

8. The power transmission apparatus of claim 7, wherein:
   the third input shaft has the central driven gear fixedly connected to a front end portion thereof, and has a 2/6-speed drive gear and a 4/8-speed drive gear disposed behind the central driven gear and selectively synchronously connected thereto by the second synchronizer.

9. The power transmission apparatus of claim 8, wherein:
   the idle shaft has the idle gear fixedly connected to a front end portion thereof to be externally gear-meshed to the central drive gear of the second input shaft and the central driven gear of the third input shaft, and has the reverse drive gear disposed behind the idle gear and selectively synchronously connected to the idle shaft by the third synchronizer.

10. The power transmission apparatus of claim 9, wherein:

the output shaft has a 1-speed driven gear, a 2/3/6/7-speed driven gear, a reverse driven gear, a 4/5/8/9-speed driven gear, and the output gear disposed thereon, the 1-speed driven gear is externally gear-meshed to the 1-speed drive gear of the first input shaft and is connected to the output shaft through a one-way clutch, the 2/3/6/7-speed driven gear is fixedly connected to the output shaft to be externally gear-meshed to the 3/7-speed drive gear and the 2/6-speed drive gear, the reverse driven gear is fixedly connected to the output shaft to be externally gear-meshed to the reverse drive gear, the 4/5/8/9-speed driven gear is fixedly connected to the output shaft to be externally gear-meshed to the 5/9-speed drive gear and the 4/8-speed drive gear, and the output gear is fixedly connected to a front end portion of the output shaft to be externally gear-meshed to a final reduction gear of the final reduction differential.

11. The power transmission apparatus of claim 3, wherein:

the first transmission further includes a motor/generator which is fixedly connected to the planetary carrier.

12. The power transmission apparatus of claim 5, wherein:

the first transmission further includes a motor/generator which is fixedly connected to the sun gear.

13. The power transmission apparatus of claim 3, wherein:

the first transmission further includes a motor/generator which is fixedly connected to the engine output shaft, and a second engine clutch is disposed on the engine output shaft between the motor/generator and the engine.

* * * * *